(12) United States Patent
McCullough

(10) Patent No.: US 6,342,960 B1
(45) Date of Patent: Jan. 29, 2002

(54) WAVELENGTH DIVISION MULTIPLEX TRANSMITTER

(75) Inventor: Edward D. McCullough, Riverside, CA (US)

(73) Assignee: The Boeing Company, Seal Beach, CA (US)

( * ) Notice: Subject to any disclaimer, the term of this patent is extended or adjusted under 35 U.S.C. 154(b) by 0 days.

(21) Appl. No.: 09/215,069

(22) Filed: Dec. 18, 1998

(51) Int. Cl.[7] .................................................. H04J 14/02
(52) U.S. Cl. ........................................ 359/124; 359/130
(58) Field of Search ................................ 359/124, 223, 359/850, 130; 372/28; 385/24

(56) References Cited

U.S. PATENT DOCUMENTS

| | | | |
|---|---|---|---|
| 3,617,710 A | * 11/1971 | Honeycutt et al. | 359/349 |
| 4,504,956 A | * 3/1985 | Ream | 372/107 |
| 4,866,694 A | * 9/1989 | Korth | 369/44.12 |
| 5,089,903 A | 2/1992 | Kuwayama et al. | 359/15 |
| 5,231,388 A | 7/1993 | Stoltz | 340/783 |
| 5,291,317 A | 3/1994 | Newswanger | 359/15 |
| 5,311,360 A | * 5/1994 | Bloom et al. | 359/572 |
| 5,315,423 A | 5/1994 | Hong | 359/124 |
| 5,323,002 A | * 6/1994 | Sampsell et al. | 250/252.1 |
| 5,355,381 A | * 10/1994 | Leilabady | 372/28 |
| 5,367,585 A | 11/1994 | Ghezzo et al. | 385/23 |
| 5,459,610 A | 10/1995 | Bloom et al. | 359/572 |
| 5,500,761 A | 3/1996 | Goossen et al. | 359/290 |
| 5,513,948 A | * 5/1996 | Bacchi et al. | 414/783 |
| 5,611,008 A | * 3/1997 | Yap | 385/14 |
| 5,613,022 A | * 3/1997 | Odhner et al. | 385/37 |
| 5,757,536 A | 5/1998 | Ricco et al. | 359/224 |
| 5,835,256 A | * 11/1998 | Huibers | 359/291 |
| 5,930,012 A | * 7/1999 | Mears et al. | 359/15 |
| 6,122,422 A | * 9/2000 | Koeppen et al. | 385/48 |

FOREIGN PATENT DOCUMENTS

| | | | |
|---|---|---|---|
| EP | 0 295 857 A | 5/1994 | H04J/15/00 |
| WO | 98 41893 A | 9/1998 | G02B/26/08 |
| WO | 99 21123 A | 4/1999 | G06K/9/20 |
| WO | 99 38348 A | 7/1999 | H04Q/11/00 |

\* cited by examiner

Primary Examiner—Jason Chan
Assistant Examiner—Christina Y. Leung
(74) Attorney, Agent, or Firm—Lawrence Ginsberg

(57) ABSTRACT

A wavelength division multiplex transmitter for modulating light from a broadband light source and coupling modulated light to an optical waveguide for digital optical communications. The wavelength division multiplex transmitter includes a diffraction grating for receiving and diffracting light from a broadband light source. A first reflecting element receives diffracted light from the diffraction grating. A spectrally programmable spatial light modulator (SLM) receives reflected diffracted light from the reflecting element and selectively modulates a selected set of wavelengths of the reflected light. A lens receives the selected set of wavelengths and directs them into an optical waveguide for digital communication. This provides enhanced utilization of each wavelength within the broadband light source.

14 Claims, 5 Drawing Sheets

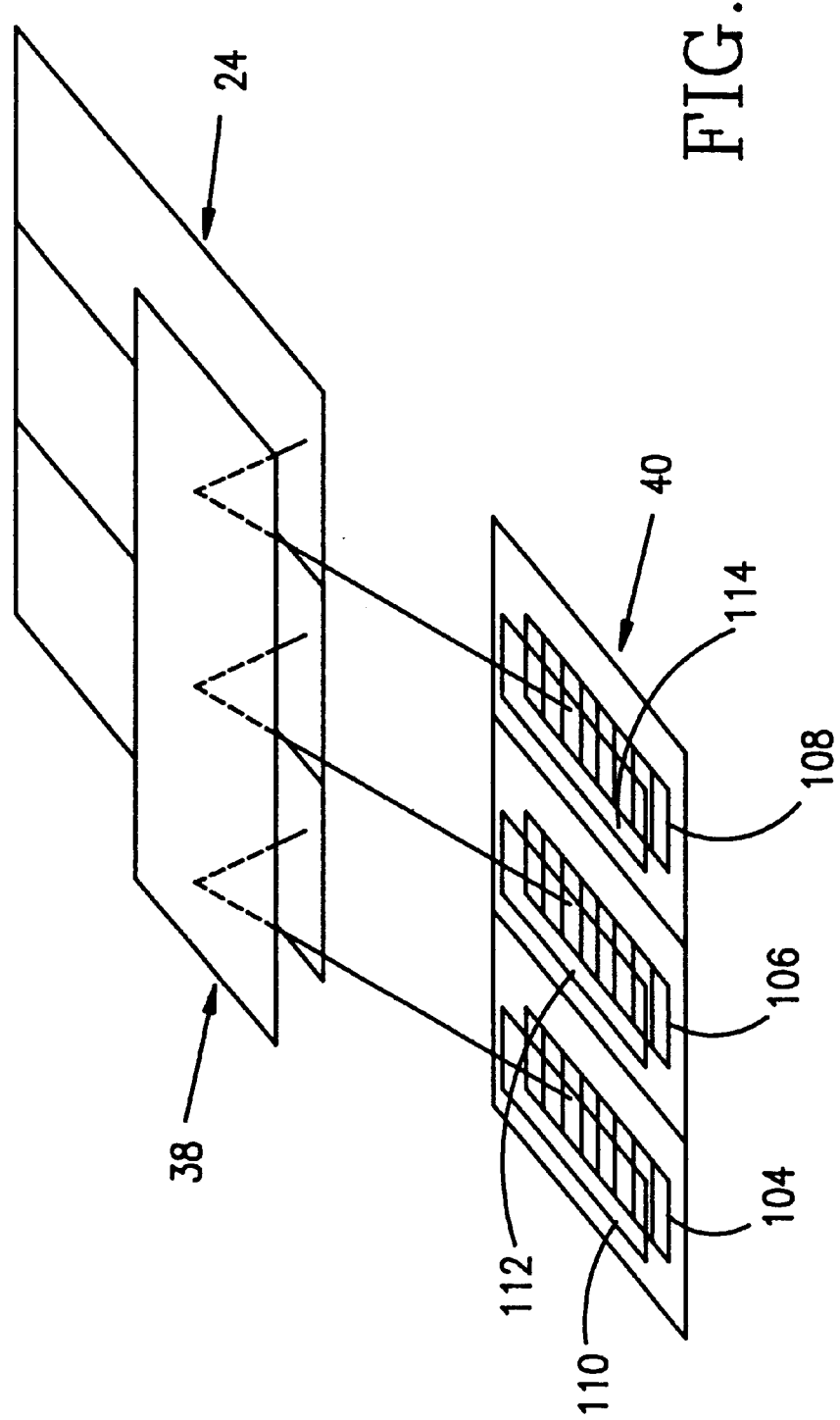

WAVELENGTH DIVISION MULTIPLEX TRANSMITTER

BACKGROUND OF THE INVENTION

1. Field of the Invention

The present invention relates to digital optical transmitters and more specifically to a wavelength division multiplex transmitter using a plurality of the light wavelengths to simultaneously transmit independent digital signals into an optical waveguide.

2. Description of the Related Art

At present, optical fibers for transmitting digital signals use lasers or LEDs with substantially constant wavelength distributions for transmitting digital signals. The signals are serially transmitted as interruptions of light of the same wavelength—thus limiting the amount of data which can be transmitted over the optical fiber to the switching performance of the laser or modulator, the properties of the fiber and the sensitivity of the receiver. Each serial signal stream is separated into its component parts, such as different phone calls, by switching labeled packets of data out of the data stream and reassembling each separate call. To increase the signal carrying capacity of the optical fiber, lasers of different wavelengths are used in the same fiber. Each laser operates independently from the others but a separate laser is required for each wavelength. The lasers can be fabricated onto a single chip and addressed independently to produce multiple independent communication channels. This is called wavelength division multiplexing (WDM). Since this technology is being driven by the telecommunications industry, systems which operate over long distances with small numbers (32) of high speed (20 Giga bits per second plus) channels are preferred over systems with large numbers of channels (500 plus) which operate at moderate speeds (0.1 Giga bits per second). The long distance aspect of the preferred telecommunications solution constrains their operations to two small regions in the infrared portion of the spectrum near 1500 and 1300 Nano meters where silica glass has the lowest attenuation of the light signals per distance traveled. In situations where long distance communications are not required, such as an aircraft, launch vehicle or submarine, the constraints are considerably less and a much greater portion of the light spectrum is available for communications.

U.S. Pat. No. 5,367,585, issued to Ghezzo et al., discloses a photonic switch which functions by controlling the physical contact of two optical waveguides. When they are touching, light is coupled from one waveguide to the other. Otherwise the coupling is interrupted.

U.S. Pat. No. 5,231,388, issued to R. A. Stoltz, discloses a device that only generates three colors, and is therefore not suitable for WDM or spectral chip CDMA optical communications.

U.S. Pat. No. 5,089,903, issued to Kuwayama et al., discloses a device that uses cascaded holograms for correcting eye position dependent blurring of an image in a heads up display. While it does correct for distorted images, it does not manipulate wavelengths for the purpose of light use efficiency.

U.S. Pat. No. 5,757,536, issued to Ricco et al, discloses a micro electro mechanical (MEMS) programmable diffraction grating which can be used for a number of tasks such as for use as a correlation spectrometer or a multiplexer for combining multiple wavelengths. The patent discloses the controlling of displacement magnitudes of individual mems elements or the periodicity of these elements to produce a common diffraction angle. A grating directs the diffracted light to a common point in space such as a detector, an optical fiber, or a slit.

U.S. Pat. No. 5,500,610, issued to Goossen et al., discloses an optical modulator with two selectable reflectivity states. All light (incident and reflected) is normal to the device surface. The zero reflectivity state corresponds to air gap dimensions equaling zero or any number of half center frequency wavelengths while the maximum reflectivity occurs in cases where the gap has an additional ¼ wavelength of the center frequency. This device functions as a low Q resonant circuit that is alternately parallel (high reflectivity) and series (high absorbtivity) with the bandpass varying between 35 to 100 nanometers depending on how the device is constructed. It is therefore of little use in applications requiring dense WDM (256 spectral chips over 100 nanometers) or spectrally based CDMA protocol optical communications.

U.S. Pat. No. 5,459,610, issued to Bloom et al., discloses a mems device for modulating white light via controllable diffraction to produce red, green and blue output to an aperture capable of receiving the zero order diffracted beam. The illustrations depict the diffraction of white light applied to each pixel. This approach is not suitable for dense WDM modulators for embedded fiber optic networks for aircraft and space vehicles due to the poor utilization of the light sources. For example, blue light is distributed to all the pixels, including those which are required to diffract blue light. This is unavoidable, as an object of their invention was to simultaneously modulate and diffract white light to produce colored light. U.S. Pat. No. 5,311,360, issued to Bloom et al., discloses an apparatus for modulating light with a dynamic mems diffraction grating. In a description of the functioning of the unit as a display illuminated with white light, it is mentioned that each pixel splits the light into a spectrum. In the process the spectrums are rotated as necessary to produce what amounts to RGB color images when viewed normal to the surface. The patent states that the device can be used for fiber optic applications, but does not cover the approach used in the present invention.

OBJECTS AND SUMMARY OF THE INVENTION

It is therefore a principal object of the present invention to modulate a selected portion of portions of the light spectrum for the purpose of carrying digital signals.

It is another object to couple modulated portions of a broadband light signal into an optical fiber for the transmission of digital signals.

It is yet another object of the invention to enable the transmission of digital words across an optical fiber by the use of the states of the digital signals on separate wavelengths to encode the bits of a binary word.

It is still another object of the invention to enable transmission of digital words to be used as a data bus, and address bus, or a control bus.

It is still another object to enable the parallel transmission of digital bits, bytes, words, and word strings.

It is still another object of the invention to provide a transmitter for a wavelength division multiple access network.

These and other objects are achieved by the present invention, which is a wavelength division multiplex transmitter for modulating light from a broadband light source and coupling modulated light to an optical waveguide for digital optical communications. The wavelength division multiplex transmitter includes a diffraction grating for receiving and diffracting light from a broadband light source. A first reflecting element receives diffracted light from the diffraction grating. A spectrally programmable spatial light modulator (SLM) receives reflected diffracted light from the reflecting element and selectively modulates a selected set of wavelengths of the reflected light. A lens receives the selected set of wavelengths and directs them into an optical waveguide for digital communication. This provides enhanced utilization of each wavelength within the broadband light source.

A preferred SLM is a grating light valve (GLV). The GLV SLM surface can be divided up into small sections each of which can manipulate specific portions of the spectrum. Slight variations in these sections allow a series of adjacent spectral portions to be broken into separately controllable channels. The GLV comprises periodically spaced alternating fixed and movable microscopic metal composite ribbons mounted on a substrate. When the movable ribbons are pulled down electrostatically, the device functions as a diffraction grating. Conversely when the ribbons are up it functions as a mirror. The tuning of the GLV sections is accomplished by setting (once via the manufacturing process) the spacing between fixed ribbon elements within each section. As a result, each section of the GLV has different dimensions to diffract different wavelengths of the incident light. The various sections of the diffraction gratings can be switched on or off by an electronic data signal to create digital light signals in any available portion of the incident wavelengths.

These and other objects, advantages and novel features of the present invention will become apparent from the following detailed description of the invention when considered in conjunction with the accompanying drawings.

BRIEF DESCRIPTION OF THE DRAWINGS

FIG. 7 is a perspective view of a calibration detector array of the present invention shown in conjunction with a reflecting element and a grating light valve.

The same elements or parts throughout the figures are designated by the same reference of characters.

DETAILED DESCRIPTION OF THE PREFERRED EMBODIMENT

Figure 1:
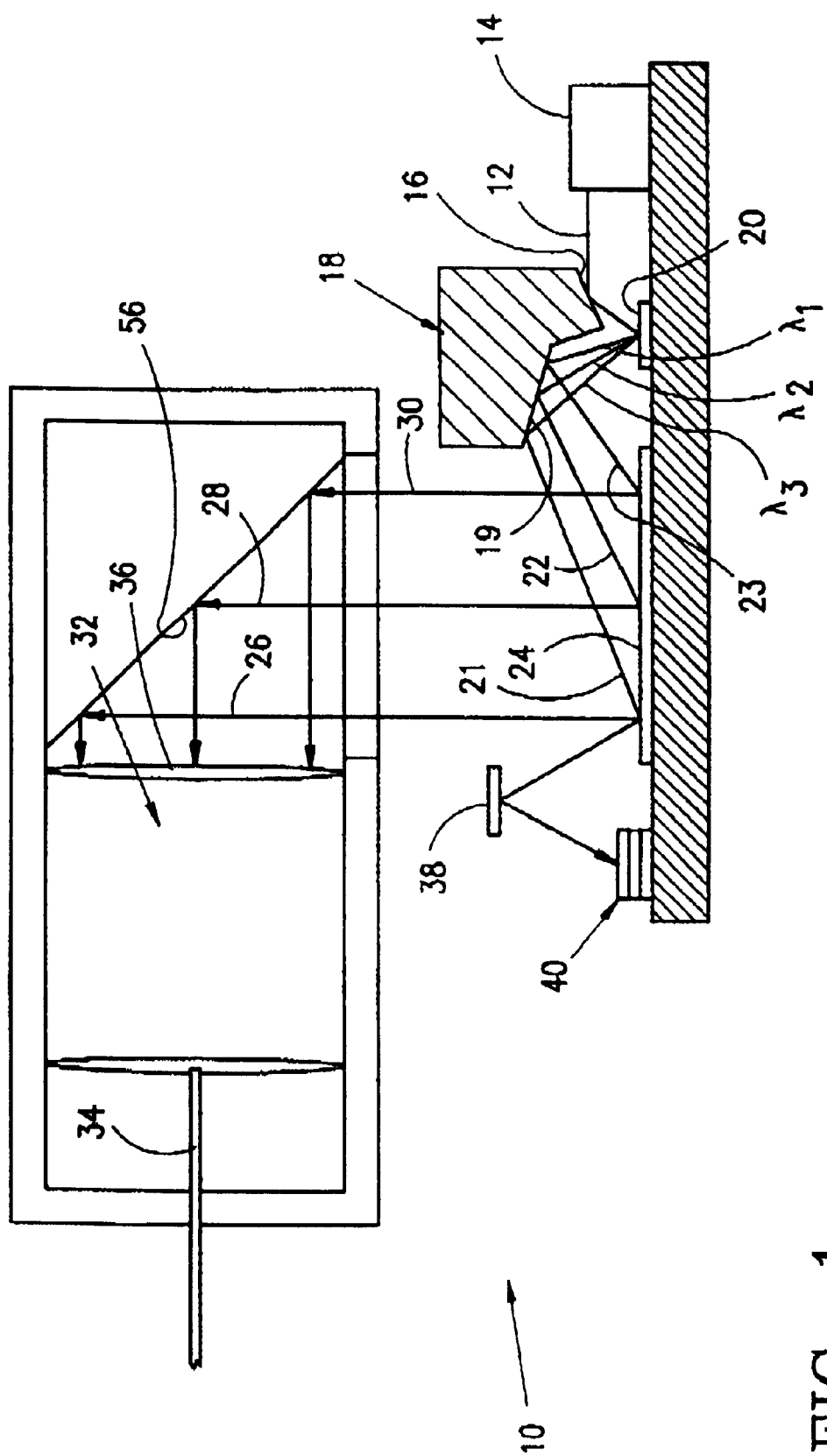
FIG. 1 is a side view of the wavelength division multiplex transmitter of the present invention.

Referring now to the drawings and the characters of reference marked thereon, FIG. 1 illustrates a preferred embodiment of the wavelength division multiplex transmitter, designated generally as 10. The transmitter 10 receives a collimated input line of broad band light 12 from a broad band light source 14. The light source 14 may include, for example, incandescent tungsten or group IV nano crystal materials imbedded in silica. In the latter instance the silica is excited with laser light with a wavelength that is shorter than the broad band light spectrum required from the nano crystals. This input broad band light 12 is directed to a surface mirror or reflecting element 16 of a reflector module assembly 18 which adjustably reflects the broad band light 12 onto a diffraction grating 20. The reflector module 18 is adjustable so that it can direct the light in a manner that eliminates alignment problems. The diffraction grating 20 may be metal or plastic and will be described in detail below.

The diffraction grating 20 splits the light into a spectrum, represented in this figure, for simplicity, as refracted light of a first wavelength $\lambda_1$, second wavelength $\lambda_2$ and a third wavelength $\lambda_3$. These wavelengths are directed to a substantially planar reflecting element 19 of the reflector module assembly 18 which reflects and directs the light onto a spectrally programmable spatial light modulator (SLM) such as a grating light valve (GLV) 24. In this preferred embodiment the diffraction grating 20 spreads out the light into a spectrum before it gets to the GLV 24 so as to more efficiently use the light from the light source 14. If light from light source 14 were to be used directly on GLV 24, the spectrum would not be presorted. Therefore most of the light generated by light source 14 would be wasted and the light intensity or signal strength entering the GRIN lens 32 would be greatly diminished. Viewed conversely the design decreases the wattage required or the size of the broad band light source 14, thus reducing the waste heat produced by the device.

The GLV 24 is a dynamic diffraction grating, such as that made by Silicon Light Machines, Inc., 385 Moffett Park Drive, Suite 115, Sunnyvale, Calif. 94089-1208. The GLV 24 selectively modulates a selected set of wavelengths of the light reflected onto it by the reflecting element 19. The GLV 24 either behaves as a diffraction grating thereby rotating the light or a mirror, merely reflecting the light. The sizing of the elements of the GLV 24 is such that the refracted light leaves the GLV 24 perpendicular to the surface.

When the GLV 24 diffracts light perpendicular to its surface, the diffracted light rays, i.e., rays 26, 28, 30 are directed to a decollumating lens such as a gradient index (GRIN) lens 32 which collects the light rays 26, 28, 30 and focuses them into an optical fiber or optical wave guide 34. Alternatively, a ball lens (described below), a convex lens or other optical device can be used in place of the GRIN lens 32 to direct the collimated diffracted rays 26, 28 and 30 into the optical fiber. Only rays entering the GRIN lens 32 which are perpendicular to surface 36 of the GRIN lens 32 will be focused to enter the optical fiber 34. Thus rays 26, 28 and 30 which are diffracted perpendicular to the surface of the GLV 24 and parallel to each other must be perpendicular to the surface 36 of GRIN lens 32 in order to be transmitted into the optical fiber 34. It is therefore important that GLV 24 and GRIN lens 32 be properly aligned.

The need to have the correct wavelength on the proper portion of GLV 24, allowing light to be diffracted perpendicular to the surface of the GLV 24 so it can be transmitted into optical fiber 34, dictates that alignment testing will have to be made to calibrate the device before (i.e., quality control testing) and during use. During use, another reflecting element 38 receives a portion of reflected light from the GLV 24 when an associated portion of the GLV 24 is in an inactive state. A calibration detector array 40 (described below) receives reflected light from the reflecting element 38. The calibration detector array 40 detects misalignment of the reflector module assembly 18 by the position of the light spot on the calibration detector array 40.

Piezoelectric actuators (also discussed below) can be used to align the reflector module assembly 18 with the GLV 24 such that the spectrum falling on GLV 24 is properly aligned. A receiver (not shown) connected to optical fiber 34 can be used to analyze the received light for known wavelengths. When these wavelengths are detected, under the proper conditions, the system will know that the spectrum is aligned properly with GLV 24.

Figure 2:
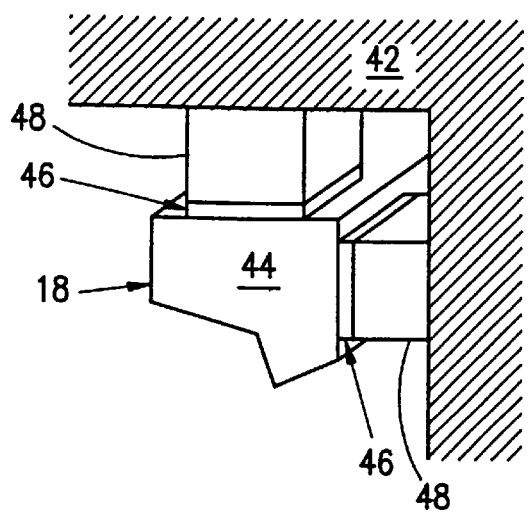
FIG. 2 is a perspective view of a reflector module assembly of the wavelength division multiplex transmitter mounted to a housing.
Figure 3:
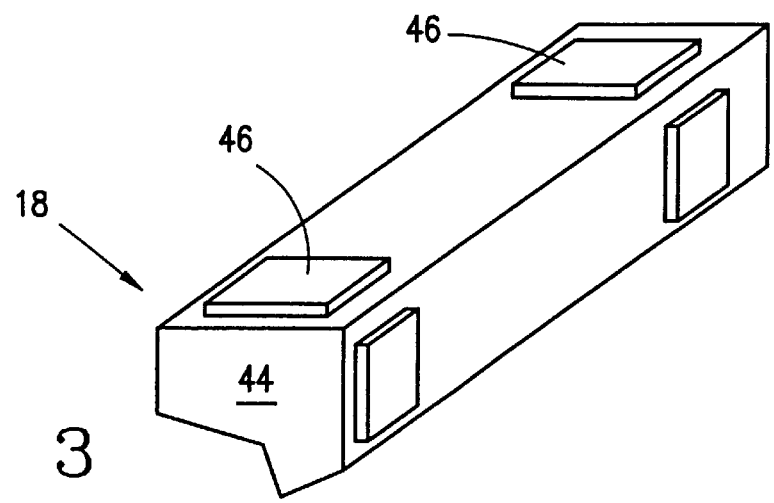
FIG. 3 is a perspective view of the reflector module assembly of the present invention.

Referring now to FIG. 2, a reflector module assembly 18 is shown mounted to a housing 42. The reflector module assembly 18 includes a reflector module 44 with linear displacement elements 46 mounted thereon. Such linear displacement elements 46 may comprise, for example, piezoelectric elements, electro-active polymers, or magnetostrictive devices. The reflector module 44 can be displaced on two axes and rotated on three axes. Compliant structures 48 secure the piezoelectric elements 46 to the main portion of the housing 42. FIG. 3 shows the reflector module assembly 18 in isolation.

Figure 4:
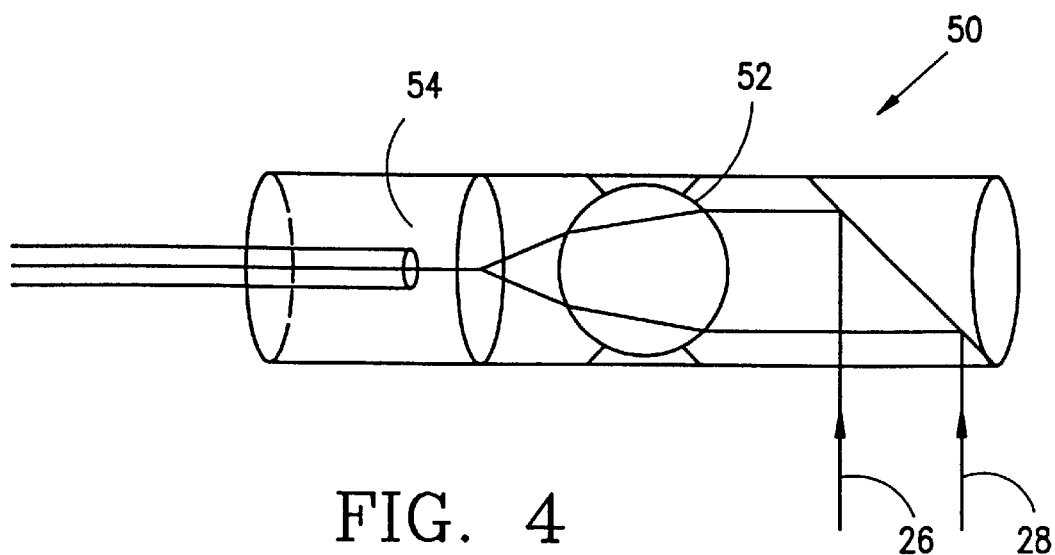
FIG. 4 is a perspective view of an alternate embodiment of the lens for the wavelength division multiplex transmitter, this alternate lens being a ball lens.

Referring now to FIG. 4, an alternate lens fixture is illustrated, designated generally as 50. Lens fixture 50 includes a ball lens 52 for receiving the selected set 26, 28, 30 of wavelengths and directing them into an optical waveguide assembly 54. The ball lens 52 has no preferred optical axis. This simplifies the alignment of the system. Ball lenses are commercially available.

Figure 5:
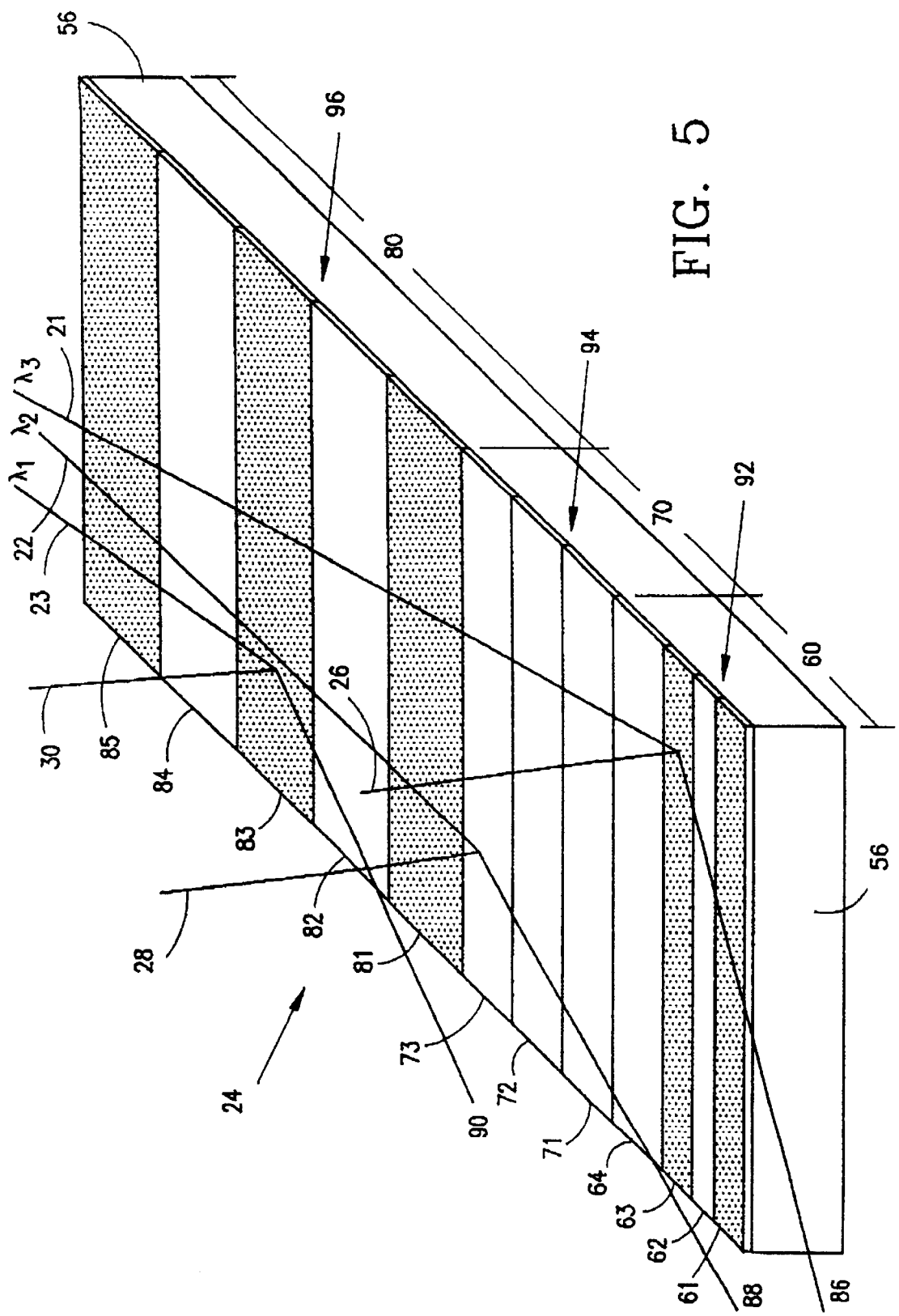
FIG. 5 is a perspective view of a grating light valve of the wavelength division multiplex transmitter of the present invention.

Referring now to FIG. 5, a section of the GLV 24 is illustrated. The GLV 24 is made up of a substrate 56 having a plurality of ribbons of which ribbons 61, 62, 63, 64, 71, 72, 73, 81, 82, 83, 84, 85 are an illustrative subset. The number of ribbons in each section 60, 70, 80 may vary. Alternate ribbons such as 61 and 63 are moveable and are electrostatically pulled down to create a diffraction grating when it is desired to have section 60 activated to diffract light. The width of the ribbons 61, 62, 63, 64 correspond to the wavelength $\lambda_3$ such that when the ribbons 61 and 63 are depressed section 60 of the GLV 24 serves as a diffraction grating for diffracting light of wavelength $\lambda_3$ perpendicular to the surface of the GLV 24 as ray 26. When section 60 of GLV 24 is not activated $\lambda_3$ is reflected as light ray 86.

When none of the ribbon sections are activated such as ribbons 71, 72, and 73 in section 70, the surface of the GLV 24 acts as a mirror and reflects the light such as $\lambda_2$ as ray 88. Similarly, when ribbons 81, 83, and 85 are activated the light of the wavelength $\lambda_1$ is diffracted as ray 30 perpendicular to the surface of the GLV 24.

As shown in FIG. 1, wavelengths $\lambda_1$, $\lambda_2$, and $\lambda_3$, are diffracted as rays 30, 28, and 26 when the respective sections 80, 70, 60 of the GLV 24 are activated. Conversely $\lambda_1$, $\lambda_2$, and $\lambda_3$, are reflected as rays 90, 88 and 86, when the respective sections 80, 70, 60 of the GLV 24 are not activated. The ribbons on the dynamic diffraction grating GLV 24 can be activated on the order of 50 million to 100 million times a second. The ribbons can be on the order of 4 microns such that 2 thousand ribbons in five hundred sections can be placed along a centimeter of substrate. Therefore a one centimeter strip of substrate can separately diffract on the order of five hundred different wavelengths of light. This provides a possible five hundred digital channels of bit streams running in parallel from GLV 24. Additional strips of GLV sections identical to that described above, aligned so that adjacent sections refract the same wavelength, allow control of the brightness of the refracted wavelengths. Spectral folding in the diffraction gratings and the GLV 24 provide for additional groups of wavelengths either shorter or longer than described above. As an example, a 0.5 by 0.5 cm substrate of GLV sections would have 5 strips of GLV sections with each strip being 50 sections tall and 250 sections long. This would give 5 times 250 equals 1250 distinct wavelengths each containing 50 individually addressable 20 micron by 20 micron sections with each group of 50 diffracting the same wavelength. This allows for an approximate 17 decibel dynamic range in the intensity that can be transmitted on one wavelength and allows for installed spares to compensate for operational failures of sections over the life cycle of the unit. Actual channel density will also depend on the conductor routing and capacity issues.

Data for turning the diffraction gratings section 60, 70, and 80 on and off is supplied by signal lines 92, 94, and 96 respectively. These signal terminals can be connected to any suitable digital signal source for transmitting data.

Figure 6:
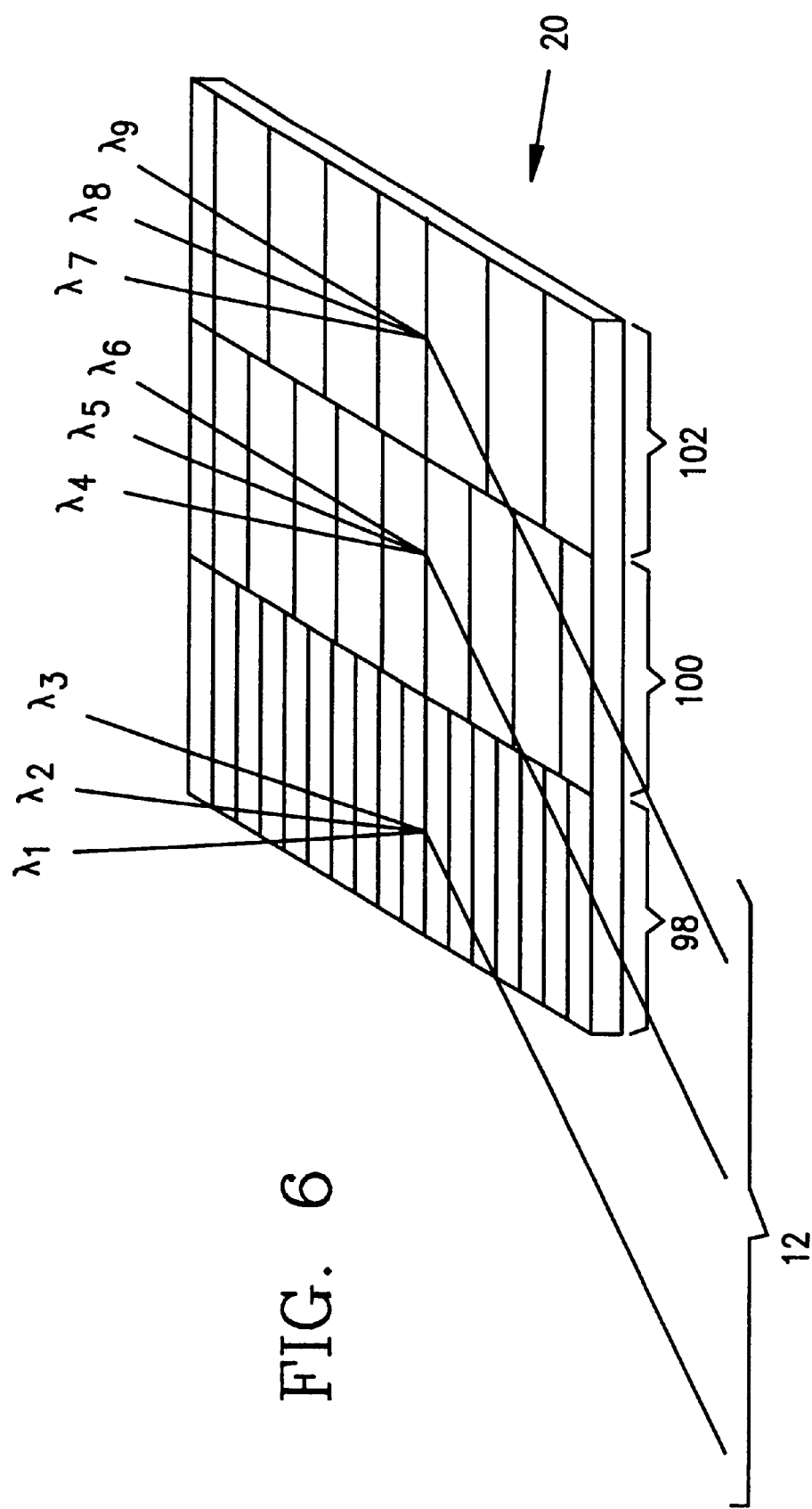
FIG. 6 is a perspective view of a diffraction grating of the wavelength division multiplex transmitter.

Referring now to FIG. 6, the diffraction grating 20 is illustrated. The diffraction grating shown is folded three times to produce three ranges of wavelengths from the same incident light sheet 12. For example, section 98 refracts the incident light sheet 12 into a spectrum represented by $\lambda_1$, $\lambda_2$, and $\lambda_3$; section 100 refracts incident light sheet 12 into a spectrum represented by $\lambda_4$, $\lambda_5$, and $\lambda_6$, where $\lambda_4$ is longer in wavelength than $\lambda_3$; and section 102 operates in a similar manner such as $\lambda_7$, is longer than $\lambda_6$. Taken together, sections 98, 100, 102 refract incident light sheet 12 into a spectrum comprising three sections with wavelengths ranging from $\lambda_1$, and $\lambda_9$. As noted above, the GLV 24 is also folded to handle three separate groups of wavelengths.

Referring now to FIG. 7, the calibration detector array 40 is shown in conjunction with the reflecting element 38 and GLV 24. The calibration detector array 40 is used to provide alignment information to position reflector module assembly 18 (FIG. 1). Array 40 includes rows 104, 106, 108 of photodiodes, which sense the reflection angle of diffracted light rays emanating from the edge of the GLV 24. When the GLV 24 is not refracting each ray is reflected at an angle which depends on the positioning of reflector module assembly 18. To ensure that the entire system is in calibration it is important to detect that the correct wavelength and angle match a particular section of the GLV 24. Optical bandpass filters 110, 112, 114 are positioned over photodiodes 104, 106, 108 to restrict the light reaching the photodiodes from reflecting element 38 to a very narrow band of wavelengths. This allows detection of the angle taken by a particular wavelength. When used with a signal sent to the ribbons at the edge of the GLV 24, one can deduce the angle of reflected light from those ribbons, thus deriving an error signal for the positioning of reflector module assembly 18.

Light rays 26, 28 and 30 result when rays 21, 22 and 23 are diffracted by activated sections in GLV 24. Light rays 26, 28 and 30 are turned through 90° by reflecting element 56 and directed into GRIN lens 32.

Light rays 26, 28 and 30 entering the optical fiber 34 are used for digital transmissions of data to a receiver over an optical communications link which decodes the bit streams and uses the information for any desired purpose. In this manner information can be transported over distances which vary with the frequency of the light used and the type of optical fiber used. For short distances such as within a building or a vehicle such as an airplane, a launch vehicle, rocket, a car, or a ship the digital light signals represented by rays of light 26, 28 and 30 will not lose much strength and can be read without intervening amplifiers or relaying devices.

Use of a GRIN lens 32 and a optical fiber 34 is just an example of one means of transmitting the digital signals from the GLV 24 to a receiving device (not shown).

Assuming 1250 parallel channels are available at 50 million bits per second 6,250 movies can be transmitted (10 million bps each), 6.25 million phone calls can be handled or one hundred 622 million bps Asynchronous Transfer Mode (ATM) channels can be sent. This is a 25 fold increase over fiber optic communications with lasers. Practical laser systems are limited by the switching, detection and multiplexing rate to approximately 2.5 Giga bps therefore only four 622 millions bps Asynchronous Transfer Mode (ATM) channels would be available. In practical systems using Wavelength Division Multiplexing (WDM) (four 2.5 Giga bps signals in an optical fiber) only sixteen 622 million bps Asynchronous Transfer Mode (ATM) channels would be available.

Obviously, many modifications and variations of the present invention are possible in the light of the above teachings. It is therefore to be understood that, within the scope of the appended claims, the invention may be practiced otherwise than as specifically described.

What is claimed and desired to be secured by Letters Patent of the United States is:

1. A wavelength division multiplex transmitter for modulating light from a broadband light source and coupling the modulated light into an optical waveguide for digital optical communication, comprising:
    (a) a broadband light source;
    (b) a first diffraction grating co-located with said broadband light source for receiving and diffracting light from said broadband light source;
    (c) a first substantially planar reflecting element for receiving diffracted light from said diffraction grating;
    (d) a spectrally programmable spatial light modulator (SLM) for receiving reflected diffracted light from said reflecting element and for selectively modulating a selected set of wavelengths of said reflected light, said wavelengths of said selected set being simultaneously modulated;
    (e) a lens for receiving said selected set of wavelengths and directing them into an optical waveguide for digital optical communications,
        wherein enhanced utilization of each wavelength within the broadband light source may be provided.

2. The wavelength division multiplex transmitter of claim 1, further comprising:
    a second reflecting element optically positioned between said diffraction grating and the broadband light source to allow the placement of the broadband light source and the SLM on the same substrate.

3. The wavelength division multiplex transmitter of claim 1, wherein said first reflecting element comprises a surface of a reflector module of a reflector module assembly, said reflector module assembly comprising a plurality of linear displacement elements for maintaining optical alignment.

4. The wavelength division multiplex transmitter of claim 3, wherein each linear displacement element comprises a piezoelectric element.

5. The wavelength division multiplex transmitter of claim 3, wherein each linear displacement element comprises an electro-active polymer.

6. The wavelength division multiplex transmitter of claim 3, further comprising:
    a third reflecting element for receiving a portion of reflected light from said SLM when an associated portion of said SLM is in an inactive state; and
    a calibration detector array for receiving reflected light from said third reflecting element, said calibration detector array for detecting misalignment of the reflector module assembly by the position of the light spot on the calibration detector array.

7. The wavelength division multiplex transmitter of claim 6, wherein said calibration detector array, comprises:
    a linear array of photo detectors; and
    a narrow band-pass optical wavelength filter mounted on said linear array for receiving said reflected light from said third reflecting element and for filtering all but a narrow band of wavelengths that reach the calibration detector array, thereby providing a variable which can be used as feedback for controlling the position of the reflector module assembly.

8. The wavelength division multiplex transmitter of claim 1, wherein said diffraction grating and said SLM are located on a common chip substrate.

9. The wavelength division multiplex transmitter of claim 6, wherein said diffraction grating, said SLM and said calibration detector array are located on a common chip substrate.

10. The wavelength division multiplex transmitter of claim 1, wherein said lens comprises a ball lens.

11. The wavelength division multiplex transmitter of claim 1, wherein said lens comprises a gradient index (GRIN) lens.

12. The wavelength division multiplex transmitter of claim 1, wherein said SLM comprises a grating light valve (GLV).

13. The wavelength division multiplex transmitter of claim 12, wherein said GLV comprises an array of columns, each of which is designed to defract a desired particular wavelength normal to an upper surface of the GLV.

14. The wavelength division multiplex transmitter of claim 12, wherein each column is independently addressable.

\* \* \* \* \*